(12) United States Patent
Questel et al.

(10) Patent No.: US 6,734,440 B2
(45) Date of Patent: May 11, 2004

(54) SUNLIGHT DOSAGE INDICATOR

(75) Inventors: John M. Questel, Stow, OH (US); Christian D. Sololowski, Akron, OH (US)

(73) Assignee: Questel Adhesives, Akron, OH (US)

( * ) Notice: Subject to any disclaimer, the term of this patent is extended or adjusted under 35 U.S.C. 154(b) by 286 days.

(21) Appl. No.: 09/792,933

(22) Filed: Feb. 27, 2001

(65) Prior Publication Data

US 2002/0117633 A1 Aug. 29, 2002

(51) Int. Cl.⁷ .............................................. G01T 1/04
(52) U.S. Cl. .................................. 250/474.1; 250/482.1
(58) Field of Search .......................... 250/474.1, 482.1; 436/902; 430/541, 338, 340, 346; 356/51, 213

(56) References Cited

U.S. PATENT DOCUMENTS

| | | | | |
|---|---|---|---|---|
| 4,229,572 A | * | 10/1980 | Zweigle | 536/89 |
| 4,705,046 A | | 11/1987 | Robillard | 128/665 |
| 4,829,187 A | * | 5/1989 | Tomita et al. | 250/474.1 |
| 5,023,138 A | | 6/1991 | McIntyre | 428/352 |
| 5,028,792 A | | 7/1991 | Mullis | 250/474.1 |
| 5,296,275 A | * | 3/1994 | Goman et al. | 428/29 |
| 5,387,798 A | | 2/1995 | Funakoshi et al. | 250/474.1 |
| 5,411,835 A | | 5/1995 | Brinser | 430/138 |
| 5,581,090 A | | 12/1996 | Goudjil | 250/474.1 |
| 5,914,197 A | | 6/1999 | Goudjil | 428/537.5 |
| 5,936,016 A | | 8/1999 | Lareginie et al. | 524/94 |
| 5,986,273 A | | 11/1999 | Tripp et al. | 250/474.1 |
| 6,132,681 A | * | 10/2000 | Faran et al. | 422/58 |
| 6,461,728 B2 | * | 10/2002 | Weiss et al. | 428/345 |
| 6,504,161 B1 | * | 1/2003 | Jackson et al. | 250/474.1 |
| 2002/0022008 A1 | | 2/2002 | Forest et al. | 424/59 |

FOREIGN PATENT DOCUMENTS

WO 01/20278 A1 3/2001

OTHER PUBLICATIONS

Specialty Chemical Sales, Inc., Resins, Prince 5130, no date available.*
Cyasorb Coating Additives, UV Light Stabilizers, Mar. 1999.*
Hercules Technical Information, Technical Report CSL–228A, copyright 1983.*
Elementis Specialties, MSDS for DayPro S–65, Nov. 1, 1993.*
TriChem, Inc., Technical Bulletin UFP–4500, Nov. 19, 1997.*
Union Camp Ink and Coating Resins, no date available.*

* cited by examiner

Primary Examiner—David Porta
Assistant Examiner—Christine Sung
(74) Attorney, Agent, or Firm—Renner, Kenner, Greive, Bobak, Taylor & Weber

(57) ABSTRACT

A multilayer sunlight dosage indicator comprising (a) an indicator layer comprising a sunlight-sensitive ink, wherein the ink undergoes a color change upon exposure to a known amount of sunlight; and (b) an overlayer comprising an amount of at least one UV absorber. A method for indicating the amount of exposure to sunlight using an indicator layer of sunlight-sensitive ink which undergoes a color change upon exposure to a known amount of sunlight and an overlayer comprising an amount of at least one UV absorber. It is possible to adjust the sensitivity of the indicator by controlling the UV absorbing materials in the overlayer.

20 Claims, 1 Drawing Sheet

SUNLIGHT DOSAGE INDICATOR

RELATED PATENT APPLICATIONS

None.

FIELD OF THE INVENTION

The present invention relates to a multilayer device which can be used to indicate the amount of exposure to sunlight. More specifically, the present invention relates to a multilayer sunlight dosage indicator comprising: (a) an indicator layer comprising a sunlight-sensitive ink, wherein the ink undergoes a color change upon exposure to a known amount of sunlight; and (b) an overlayer comprising an amount of at least one UV absorber. The present invention also relates to a method for indicating the amount of exposure to sunlight. Further, the present invention relates to a method for adjusting the sensitivity of the indicator by adding UV absorbing materials to the overlayer.

BACKGROUND OF THE INVENTION

Sunlight contains ultraviolet (UV) radiation. In small amounts, UV radiation is necessary and healthy. For example, it aids in the production of vitamin D. Excessive exposure to UV radiation, however, can have harmful effects on health, including sunburn. In view of this, various devices have been developed to indicate and measure UV exposure, so that excessive exposure can be avoided.

U.S. Pat. No. 4,705,046 discloses a device for the qualitative measurement of UV radiation received by the skin. When the device is exposed to sunlight, a comparison of the color density of a photochromic material and a reference dye allows a qualitative determination of the amount of exposure to UV radiation.

U.S. Pat. No. 5,581,090 discloses an ultraviolet detector based on a photochromic composition that changes color upon exposure to UV rays. The photochromic material is dissolved in a solvent and applied to an article such as a watch or credit card.

U.S. Pat. No. 5,914,197 teaches an UV active wristband which changes color reversibly from clear to any visible color when exposed to a UV source.

U.S. Pat. No. 5,986,273 discloses an ultraviolet radiation sensor that may be worn on the skin. The sensor includes a transparent membrane, an adhesive, and an indicator that reversibly alters its color when exposed to UV radiation.

These prior art devices are able to indicate a fairly narrow range of UV exposure, but the amount of UV exposure safely tolerated by humans varies over a wide range. Furthermore, the color change in the prior art devices is reversible. This is, once the user moves out of exposure the devices reverse and, upon reexposure, will again begin their measurement. Therefore, they cannot be used to measure cumulative UV exposure.

Also, skin type is an important factor in determining how much UV exposure is safe and how much is detrimental. Sensitive skin burns easily and more severely at lower levels of UV exposure than normal skin. Fair-skinned people require only about 15–60 minutes of midday summer sunshine to induce an erythemal reaction. Thus, a sunlight dosage indicator that changes color after about 15–60 minutes is needed for use by fair-skinned people.

On the other hand, people with normal skin may require 1 to 2 hours of exposure before an erythemal reaction is observed so that sunlight dosage indicator with a response time of 1 to 2 hours is needed for use by people with normal skin. An indicator with an even longer response time is needed for people with moderately pigmented skin. A sunlight dosage indicator that can be customized for sensitive, normal, or other skin type would therefore be advantageous to accommodate usage by persons having a wide range of sensivitity.

Additionally, because people often apply sunscreen to minimize the skin's exposure to UV radiation, a sunlight dosage indicator should complement the use of sunscreen by tolerating a coating of sunscreen, while still accurately indicating the UV light dosage to the protected skin.

As noted then, the sunlight dosage indicator should provide a cumulative measure of UV exposure; should also provide an improvement in abrasion resistance, water resistance, saltwater resistance, and resistance to chemicals used to sanitize swimming pool water; be usable by persons of varying sensitivity; and be usable with or without sunscreen.

SUMMARY OF THE INVENTION

In light of the foregoing, it is a first aspect of the present invention to provide a multilayer device which can be used to indicate the amount of exposure to sunlight. This aspect of the present invention is achieved by a multilayer sunlight dosage indicator comprising (a) an indicator layer comprising a sunlight-sensitive ink, wherein the ink undergoes a color change upon exposure to a known amount of sunlight; and (b) an overlayer comprising an amount of at least one UV absorber.

Another aspect of the present invention is to provide a method for indicating the amount of exposure to sunlight. This aspect of the present invention is achieved by providing a multilayer sunlight dosage indicator comprising (a) an indicator layer comprising a sunlight-sensitive ink, wherein the ink undergoes a color change upon exposure to a known amount of sunlight; and (b) an overlayer comprising an amount of at least one UV absorber, wherein the color change indicates exposure to a known amount of sunlight.

A further aspect of the present invention is to provide a method for adjusting the sensitivity of the sunlight dosage indicator. This aspect of the present invention is achieved by (1) providing a multilayer sunlight dosage indicator comprising (a) an indicator layer comprising a sunlight-sensitive ink, wherein the ink undergoes a color change upon exposure to a known amount of sunlight; and (b) an overlayer comprising an amount of at least one UV absorber, and (2) selecting the amount of UV absorber to alter the amount of sunlight necessary to cause the ink to change color.

Other aspects of the present invention, as well as the advantages thereof over existing prior art forms, will become apparent from the following brief description considered and interpreted in view of the accompanying drawing, and are accomplished by the improvements hereinafter described and claimed.

BRIEF DESCRIPTION OF THE DRAWING

For a complete understanding of the objects, techniques and structure of the invention, reference should be made to the following detailed description and accompanying drawing wherein.

BRIEF DESCRIPTION OF THE PREFERRED EMBODIMENTS

Figure 1:
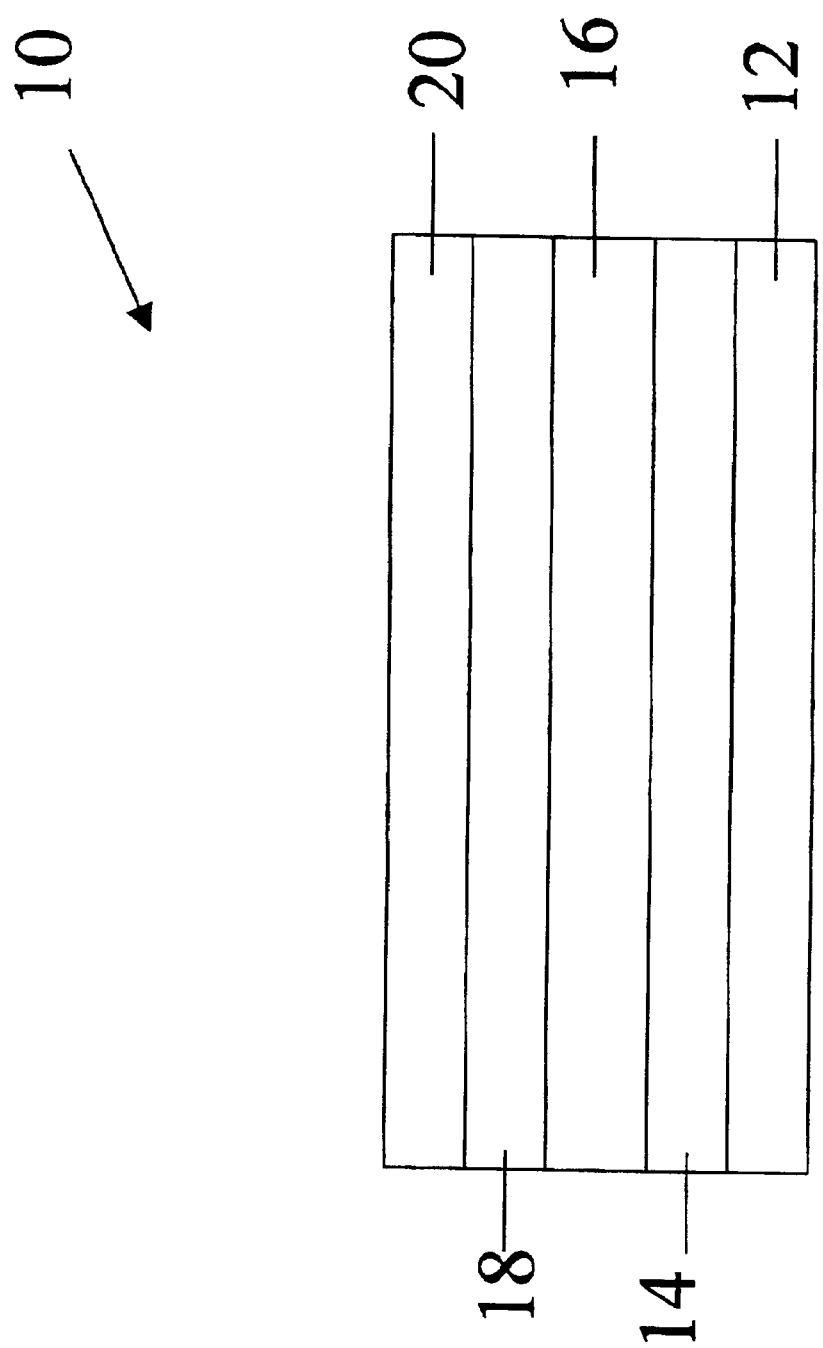
FIG. 1 is a sectional view of the sunlight dosage indicator according to a preferred embodiment of the present invention.

The present invention relates to a multilayer device which can be used to indicate the amount of exposure to sunlight. The present invention additionally relates to a method for indicating the amount of exposure to sunlight. The present invention also relates to a method for adjusting the sensitivity of the indicator by adding UV absorbers to the overlayer.

The multilayer device of the present invention comprises (a) an indicator layer comprising a sunlight-sensitive ink, and (b) an overlayer comprising an amount of at least one UV absorber.

This indicator layer comprises a sunlight-sensitive ink. For purposes of this specification, a sunlight-sensitive ink is a material which reliably changes color upon exposure to the ultraviolet radiation present in sunlight. Materials that change color upon exposure to UV radiation in this ink formulation include, but are not limited to, ethyl orange, Congo red, methyl red, indigo carmine, and specirazine ethyl violet. The indicator layer may further comprise binders, surfactants, viscosity control agents, and color change enhancers.

In one preferred embodiment, the sunlight-sensitive ink comprises ethyl orange. Ethyl orange, also known as 4'-diethylaminoazobenzene-4-sodium sulfonate, is available from Dudley Chemical Corporation. To form the sunlight-sensitive ink mixture, ethyl orange is dissolved in a binder such as a vinylidene chloride copolymer emulsion. The binder provides film strength. It may also degrade upon exposure to UV radiation, and thus contribute to the color change. A defoaming agent, such as Foammaster S from Diamond Shamrock Corporation, is also added, along with a solution of hydroxy ethyl cellulose in water. A preferred hydroxy ethyl cellulose is HEC N-100, available from Hercules Corporation. Hydroxy ethyl cellulose is useful to control the viscosity of the ink mixture. A surfactant, such as sodium lauryl sulfate, is also preferably added to the ink mixture, along with a solution of lithium chloride in water. Lithium chloride promotes the color change of the ethyl orange ink mixture.

As described above, the indicator layer comprises a mixture formed by combining ingredients including a sunlight-sensitive ink, a binder, and optionally, a surfactant, a viscosity control agent, and a color change enhancer. Preferably, the material that changes color is present in the ink mixture in an amount of from about 0.03 to about 1.0 parts by weight (pbw) per 1000 pbw binder, and more preferably, from about 0.1 to about 0.5 pbw per 1000 pbw binder. The surfactant is preferably present in an amount of from 0 to about 2.5 pbw per 1000 pbw binder, and more preferably from about 0.1 to about 0.25 pbw per 1000 pbw binder. The viscosity control agent is preferably present in an amount of from 0 to about 0.1 pbw per 1000 pbw binder, and more preferably from about 0.05 to about 0.06 pbw per 10000 pbw binder. The color change enhancer is preferably present in an amount of from 0 to about 1.0 pbw per 1000 pbw binder, and more preferably, from about 0.4 to about 0.5 pbw per 1000 pbw binder.

In one embodiment of the present invention, the indicator layer mixture described above is applied to a substrate. Suitable substrates include any material to which the indicator layer will adhere. White or light-colored materials do not mask the color change of the sunlight-sensitive ink, and are therefore preferred. Suitable materials for use as a substrate include, but are not limited to, white lithographic paper, white polyvinyl chloride (PVC) film, or other paper, film, or foil having a white, opaque coating. Lithographic paper is available from a variety of manufacturers, including Westvaco Company. PVC film is available from Cadillac Plastics and Chemical Company.

Overlayer (b) of the present invention comprises a colorless lacquer mixture formed from ingredients comprising a binder, a thickener, a polyester resin, and one or more solvents. The mixture further comprises processing aids such as waxes, surfactants, and the like. Suitable binders include, but are not limited to, polyamide resins. Preferred binders are maleic rosin resins, such as Unirez 8115, available from Union Camp Corp. Ethyl cellulose is a preferred thickener.

The overlayer functions to adjust the response time of the sunlight dosage indicator. A colorless lacquer can absorb UV radiation, thereby decreasing the amount of radiation reaching the sunlight-sensitive ink in the indicator layer. The more UV radiation absorbed by the overlayer, the more sunlight necessary to cause the ink to change color. Therefore, the more UV absorber the overlayer contains, the greater the exposure to sunlight required to produce a color change in the indicator.

For purposes of this specification, the term UV absorber refers to a substance that absorbs radiation having a wavelength of from about 230 nanometers (nm) to about 365 nm. For example, ethyl cellulose is a UV absorber. An overlayer 2 mils thick, comprising ethylcellulose, transmits only about 40% of light having a wavelength of 260 nm.

Some adjustments in the amount of radiation absorbed can be made by adjusting the thickness of the overlayer. The response time can be further manipulated by adding additional UV absorber components to the overlayer. In one embodiment, therefore, the overlayer comprises an additional component that is a UV absorber. Examples of components that absorb UV radiation include light stabilizers such as benzophenones, benzotriazoles, and triazines. A preferred UV absorber is 2,2'-dihydroxy-4-methoxybenzophenone, available as Cyasorb UV-24, from Cytec Industries. The mixture used to form the overlayer may further comprise solvents, binders, surfactants, viscosity control agents, polymers, and the like.

Referring now to FIG. 1, it can be seen that in a preferred embodiment of the present invention, multilayer sunlight dosage indicator 10 comprises a removable layer 12, an adhesive layer 14, a substrate 16, an indicator layer 18, and a clear overlayer 20.

Removable release layer 12 covers and protects adhesive layer 14 during storage and handling. Prior to use, removable release layer 12 is removed from indicator 10. This may be accomplished by, for example, peeling removable release layer 12 away from adhesive layer 14. The adhesive layer 14 is thereby exposed, and may be used to affix indicator 10 to skin, clothing, or other surface. Removable release layer 12 comprises a paper, film, or foil substrate coated with a release agent. Typically, release agents are chemically based upon silicone thermosetting resins, fluorosilicone thermosetting resins, or octadecyl carbamate resins. Preferably, removable release layer 12 comprises silicone-treated release paper.

Adhesive layer 14 is disposed adjacent to removable layer 12 and proximate to substrate layer 16. Adhesive layer 14 preferably comprises a pressure sensitive adhesive suitable for human skin contact. Numerous examples of such adhesives are known in the art, including those used for plastic bandages, medical patches, and the like. Non-limiting examples of pressure sensitive adhesives suitable for human skin contact include, but are not limited to, Gelva® Multipolymer Emulsion 2397 and Gelva® Multipolymer Emulsion 3011, both available from Monsanto Company.

Substrate 16 is disposed proximate to adhesive layer 14 and indicator layer 18. Overlayer 20 is disposed proximate to indicator layer 18. The overlayer 20 covers and protects indicator layer 18 from abrasion and from chemical attack.

The present invention also provides a method for indicating the amount of exposure to sunlight. The method comprises the step of providing a multilayer sunlight dosage indicator comprising (a) an indicator layer comprising a sunlight-sensitive ink, wherein the ink changes color upon exposure to a known amount of sunlight, and (b) an overlayer comprising an amount of at least one UV absorber. The color change indicates exposure to a known amount of sunlight. The indicator layer, overlayer, and optional substrate, adhesive layer, and removable layer are as described above.

The amount of UV absorber present in the overlayer affects the response time of the sunlight dosage indicator. The more UV absorber present in the overlayer, the more exposure to sunlight necessary to reach the indicator layer and cause the ink to change color. A known amount of UV absorber in the overlayer corresponds to a known amount of UV radiation absorbed. Because the ink changes color only after exposure to a known amount of sunlight, advantageously, the amount of exposure required for a color change can be manipulated by selecting the amount of UV absorber in the overlayer. Accordingly, the present invention is also directed toward a method for adjusting the sensitivity of the multilayer sunlight dosage indicator, the method comprising the steps of (1) providing a sunlight dosage indicator as described above, and (2) selecting the amount of UV absorber to alter the known amount of exposure to sunlight necessary to cause the ink to change color. The base lacquer composition absorbs some UV light and thus reduces the amount of UV light which reaches the sunlight-sensitive ink. For example, where the overlayer comprises the base lacquer composition without an additional UV absorber component, the sunlight-sensitive ink changes color after an exposure of about 0.8 minimal erythema dosage (MED). One MED is defined as the amount of exposure to UV radiation after which a normal individual's skin turns perceptively pink and the pinkness lasts beyond a 24 hour period.

According to the method of the present invention, the overlayer may further comprise one or more UV absorbers in addition to the base lacquer. The total amount of the UV absorbers present in the overlayer is selected to produce the desired response time in the sunlight-sensitive ink. A sunlight dosage indicator designed for use with sensitive skin preferably has UV absorbers present in the overlayer in an amount of from 0 to about 0.1 pbw per 100 pbw binder. More preferably, the UV absorber is present in the overlayer in an amount of from about 0.02 to about 0.03 pbw per 100 pbw binder. A sunlight dosage indicator designed for use with normal skin preferably has UV absorbers present in the overlayer in an amount of from about 0.1 to about 0.7 pbw per 100 pbw binder, and more preferably, from about 0.4 to about 0.5 pbw per 100 pbw binder. A sunlight dosage indicator for use with moderately pigmented skin types preferably has UV absorbers present in the overlayer in an amount greater than about 0.7 pbw per 100 pbw binder, and more preferably, from about 0.7 to about 0.9 pbw per 100 pbw binder.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

EXAMPLE 1

A sunlight-sensitive ink mixture was prepared as follows. 467.80 pounds (lbs.) of a binder was weighed into a 55 gallon drum. The binder used was Vycar™ 650X18, available from BFGoodrich Specialty Chemicals. Then 1189.3 grams (g) of ethyl orange sodium salt was added and mixed until dissolved. The following ingredients were added: (1) 531.0 g of Foammaster S, a foam inhibitor available from Diamond Shamrock, (2) 80.0 lbs. of a solution of 1061.9 g lithium chloride dissolved in 3185.7 g distilled water, (3) 2429.6 g sodium lauryl sulfate, and (4) 4247.6 g of a solution of 964.75 g hydroxy ethyl cellulose dissolved in 82.875 lbs. distilled water. All ingredients were thoroughly mixed.

An overlayer mixture was prepared as follows. 7290 g ethanol and 4302 g methanol were weighed into a 5 gallon pail, and mixed with a colloid mill. While mixing, 828 g of polyester resin, Prince™ 5130, available from Eastman Chemical, was added and completely solubilized. Mixing was continued as 3276 g of binder was added and solubilized. The binder used was Unirex® 8115, available from Union Camp. While still mixing, 90 g of surfactant, DP S-65, available from Elementis Specialties, was added. After two minutes of further mixing, 324 g of UFP-4500, a polyethylene wax available from Lawter International, was added. After five minutes of further mixing, 234 g of ethyl cellulose, specifically N-100 from Hercules, was added and mixed for an additional five minutes.

The indicator layer was applied using a commercially available coating machine equipped with a wire wound bar metering system. After the indicator layer had dried to a tack-free state, the overlayer was applied over the indicator layer.

Using an Ultraviolet Meter model 3D, manufactured by the Solar Light Company, it was determined that the indicator changed color upon exposure to ultraviolet light equivalent to a 0.5 MED dose of sunlight.

EXAMPLE 2

In Example 2, the procedure described in Example 1 was repeated except that the overlayer contained an additional component. After adding the ethyl cellulose and mixing for five minutes, 82 g of Cyasorb® UV-24, UV absorbing material available from Cytec Industries, was added and mixed for ten minutes.

It was determined that this indicator changed color upon exposure to ultraviolet light equivalent to a 1.0 MED dose of sunlight.

Thus it should be evident that the multilayer sunlight dosage indicator of the present invention can be customized for sensitive, normal, or other skin type. Advantageously, the sunlight dosage indicator can complement the use of sunscreen. A coating of sunscreen may be applied directly onto the overlayer. The amount of UV exposure necessary to change the color of the sunlight-sensitive ink will increase, just as a coating of sunscreen on skin increases the amount of UV exposure necessary to cause sunburn. The coated indicator will thus accurately indicate when the UV light dosage to the protected skin reaches an unsafe level. The color change of the sunlight-sensitive ink is not reversible.

Therefore, the sunlight dosage indicator provides a cumulative measure of UV exposure, even if the wearer temporarily goes indoors, underwater, or the like. The overlayer is resilient, and provides an improvement in abrasion resistance, water resistance, saltwater resistance, and resistance to chemicals used to sanitize swimming pool water.

While a full and complete description of the invention has been set forth in accordance with the dictates of the Patent Statutes, it should be understood that modifications can be resorted to without departing from the spirit hereof or the scope of the appended claims.

Thus, the invention is not to be unduly limited to the illustrative embodiments set forth herein.

What is claimed is:

1. A multilayer sunlight dosage indicator comprising
   (a) an indicator layer comprising a vinylidene chloride copolymer and a sunlight-sensitive ink, wherein the ink includes ethyl orange, Congo red, methyl red, indigo carmine, or specirazine ethyl violet, and wherein the ink undergoes a color change upon exposure to a known amount of sunlight; and
   (b) an overlayer comprising an amount of at least one UV absorber.

2. The multilayer sunlight dosage indicator of claim 1, wherein the indicator layer comprises a substrate comprising paper, film, or foil, and wherein the paper, film, or foil comprises a white, opaque coating.

3. The multilayer sunlight dosage indicator of claim 1, wherein the overlayer comprises a colorless lacquer mixture formed from ingredients comprising ethyl cellulose and a binder.

4. The multilayer sunlight dosage indicator of claim 3, wherein the lacquer mixture further comprises a UV absorber selected from the group consisting of 2,2'-dihydroxy-4-methoxybenzophenone, 2[hydroxy-5-t-octylphenyl]-benzotriazole, substituted benzophenones, and substituted benzotriazoles.

5. The multilayer sunlight dosage indicator of claim 4, wherein the lacquer mixture comprises from about 0 to about 0.9 pbw 2,2'-dihydroxy-4-methoxybenzophenone per 100 pbw binder.

6. The multilayer sunlight dosage indicator of claim 1, further comprising a pressure sensitive adhesive layer.

7. The multilayer sunlight dosage indicator of claim 6, further comprising a removable layer selected from the group consisting of silicone coated release paper, and silicone coated plastic film.

8. The multilayer sunlight dosage indicator of claim 1, wherein the UV absorber absorbs radiation having a wavelength of from about 230 nanometers to about 365 nanometers.

9. A method for indicating an amount of exposure to sunlight, the method comprising the step of:
   providing a multilayer sunlight dosage indicator comprising:
   (a) an indicator layer comprising a vinylidene chloride copolymer and a sunlight-sensitive ink, wherein the ink includes ethyl orange, Congo red, methyl red, indigo carmine, or specirazine ethyl violet, and wherein the ink changes color upon exposure to a known amount of sunlight; and
   (b) an overlayer comprising an amount of at least one UV absorber.

10. The method of claim 9, wherein the indicator layer comprises a substrate comprising paper, film, or foil, and wherein the paper, film, or foil comprises a white, opaque coating.

11. The method of claim 9 wherein the overlayer comprises a colorless lacquer mixture formed from ingredients comprising ethyl cellulose and a binder.

12. The method of claim 11, wherein the lacquer mixture further comprises a UV absorber selected from the group consisting of 2,2'-dihydroxy-4-methoxybenzophenone, 2[hydroxy-5-t-octylphenyl]-benzotriazole, substituted benzophenones, and substituted benzotriazoles.

13. The method of claim 12, wherein the lacquer mixture comprises from about 0 to about 0.9 pbw 2,2'-dihydroxy-4-methoxybenzophenone per 100 pbw binder.

14. The method of claim 9, further comprising a pressure sensitive adhesive layer.

15. The method of claim 14, further comprising a removable layer selected from the group consisting of silicone coated release paper, and silicone coated plastic film.

16. A method for adjusting sensitivity of a multilayer sunlight dosage indicator, the method comprising the steps of:
   (1) providing a multilayer sunlight dosage indicator comprising:
      (a) an indicating layer comprising a vinylidene chloride copolymer and a sunlight-sensitive ink, wherein the ink changes color upon exposure to a known amount of sunlight; and
      (b) an overlayer comprising an amount of at least one UV absorber and a binder; and
   (2) selecting said amount of UV absorber to alter the amount of sunlight necessary to cause the ink to change color.

17. The method of claim 16, wherein the amount of UV absorber is selected to include from about 0 to about 0.1 pbw 2,2'-dihydroxy-4-methoxybenzophenone per 100 pbw binder.

18. The method of claim 16, wherein the amount of absorber is selected to include from about 0.1 to about 0.7 pbw 2,2'-dihydroxy-4-methoxybenzophenone per 100 pbw binder.

19. The method of claim 16, wherein the amount of UV absorber is selected to include from about 0.7 to about 0.9 pbw 2,2'-dihydroxy-4-methoxybenzophenone per 100 pbw binder.

20. The method of claim 16, wherein the sunlight-sensitive ink comprises ethyl orange, Congo red, methyl red, indigo carmine, or specirazine ethyl violet.

* * * * *